United States Patent
Bourguignon et al.

(10) Patent No.: US 6,907,856 B2
(45) Date of Patent: Jun. 21, 2005

(54) INTERNAL COMBUSTION ENGINE WITH SPARK IGNITION AND DIRECT FUEL INJECTION COMPRISING A VERY HIGH-PRESSURE DIRECT INJECTION SYSTEM

(75) Inventors: Eric Bourguignon, Montmorency (FR); Pascal Sulkowski, Rueil-Malmaison (FR)

(73) Assignee: Peugeot Citroen Automobiles S.A., Velizy Villacoublay (FR)

( * ) Notice: Subject to any disclaimer, the term of this patent is extended or adjusted under 35 U.S.C. 154(b) by 0 days.

(21) Appl. No.: 10/492,128
(22) PCT Filed: Aug. 2, 2002
(86) PCT No.: PCT/FR02/02794
§ 371 (c)(1), (2), (4) Date: Apr. 7, 2004
(87) PCT Pub. No.: WO03/042519
PCT Pub. Date: May 22, 2003

(65) Prior Publication Data
US 2004/0250791 A1 Dec. 16, 2004

(30) Foreign Application Priority Data
Oct. 10, 2001 (FR) .......................................... 01 13051

(51) Int. Cl.⁷ ................................................. F02F 3/26
(52) U.S. Cl. ...................................... 123/276; 123/279
(58) Field of Search ................................ 123/276, 279, 123/302, 305, 295

(56) References Cited

U.S. PATENT DOCUMENTS

| | | | | |
|---|---|---|---|---|
| 2,682,862 A | * | 7/1954 | Camner | 123/276 |
| 4,721,081 A | * | 1/1988 | Krauja et al. | 123/298 |
| 5,685,273 A | * | 11/1997 | Johnson et al. | 123/446 |
| 5,771,857 A | | 6/1998 | Willi | |
| 5,813,385 A | * | 9/1998 | Yamauchi et al. | 123/276 |
| 5,992,353 A | | 11/1999 | Posselt | |
| 6,575,132 B1 | * | 6/2003 | Ernst et al. | 123/295 |

FOREIGN PATENT DOCUMENTS

| | | |
|---|---|---|
| DE | 197 04 640 | 8/1998 |
| DE | 100 07 659 | 9/2001 |
| EP | 1 136 685 | 9/2001 |

* cited by examiner

Primary Examiner—Mahmoud Gimie
(74) Attorney, Agent, or Firm—Leydig, Voit & Mayer, Ltd.

(57) ABSTRACT

The invention relates to an internal combustion engine with spark ignition and direct fuel injection. The inventive engine comprises: a cylinder; a cylinder head; a piston which is mounted to slide in the cylinder; a combustion chamber which is defined in the cylinder between the cylinder head and the piston; a fuel injector which opens into the combustion chamber; a spark plug; inlet and exhaust valves; and a fuel injection pump which supplies the injector with a flow of pressurized fuel. According to the invention, the pressure of the fuel flow supplied to the injector exceeds 300 bar and, preferably, reaches or exceeds 500 bar.

13 Claims, 2 Drawing Sheets

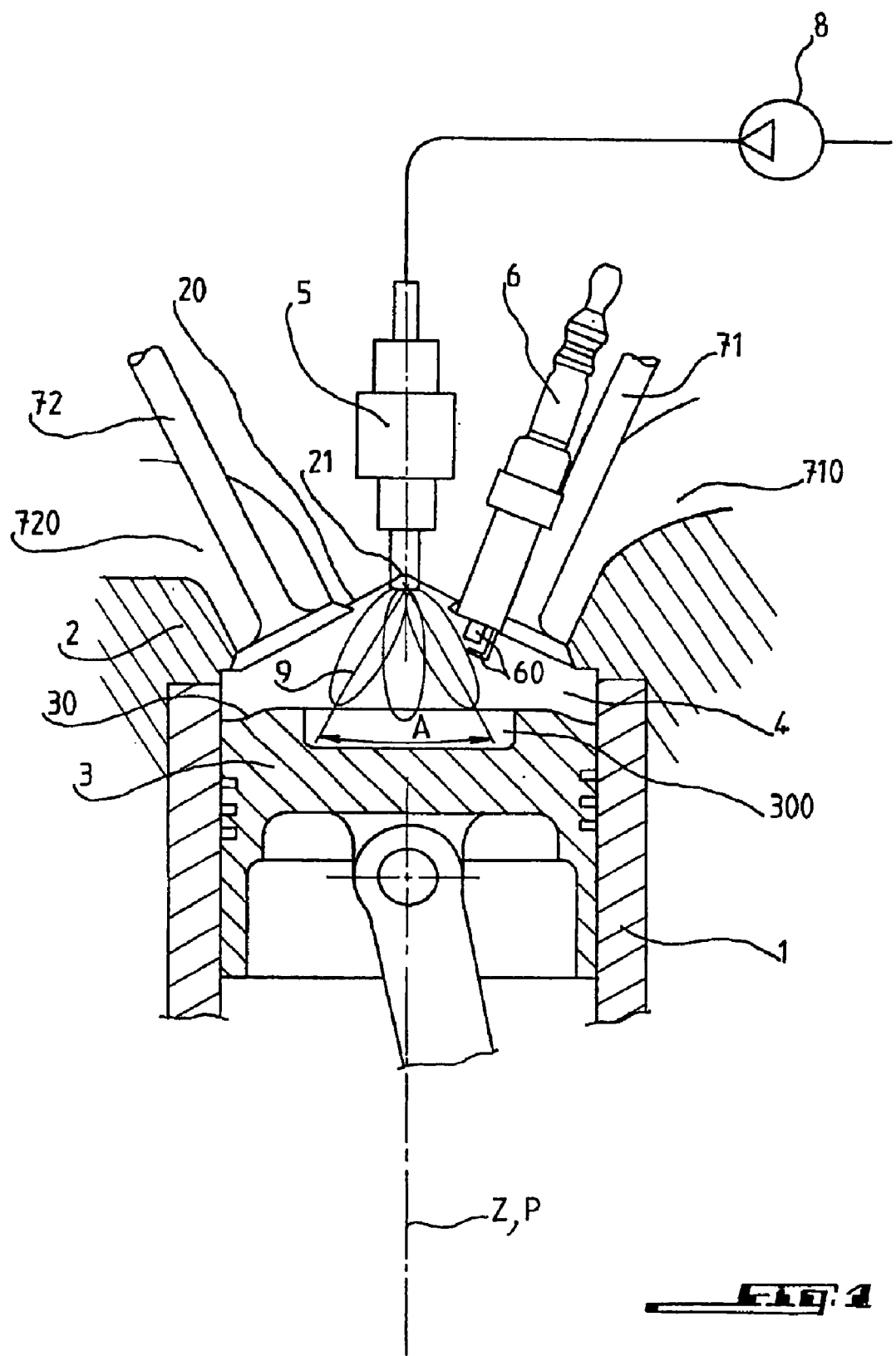

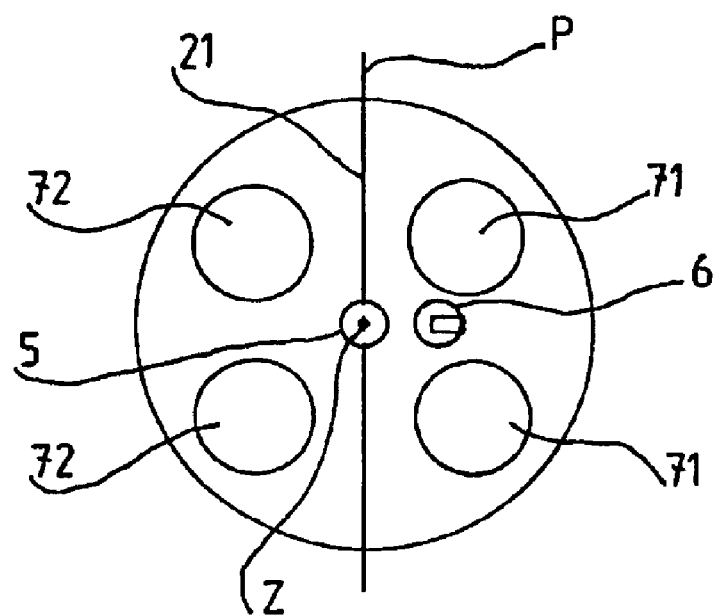
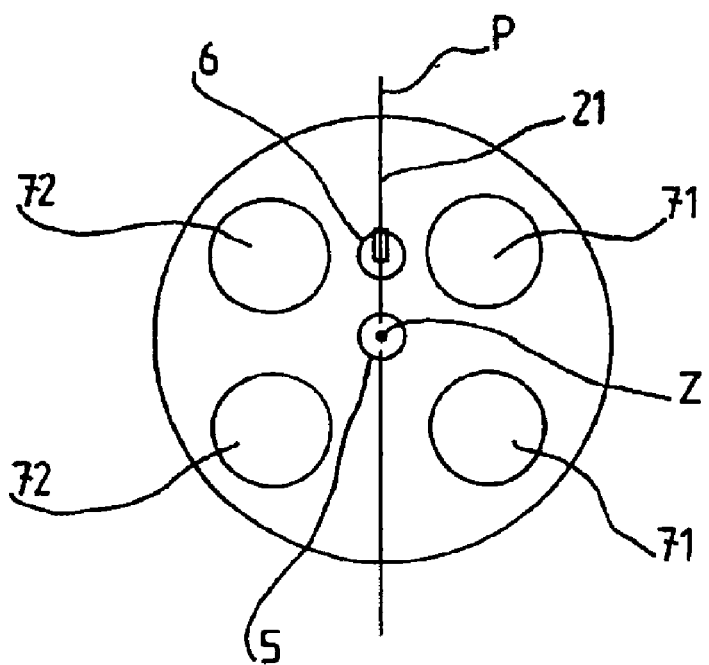

INTERNAL COMBUSTION ENGINE WITH SPARK IGNITION AND DIRECT FUEL INJECTION COMPRISING A VERY HIGH-PRESSURE DIRECT INJECTION SYSTEM

The present invention relates generally to injection techniques for gasoline engines with direct injection.

More precisely, the invention relates to an internal combustion engine with spark ignition and with direct fuel injection, this engine comprising at least a cylinder elongated along an axis, a head which closes off the cylinder in a fixed manner, a piston mounted to slide in a sealed manner in the cylinder along the axis of the cylinder, a combustion chamber defined in the cylinder between a lower surface of the head and an upper surface of the piston, a fuel injector connected to the head and opening into the combustion chamber, a spark plug connected to the head and having electrodes which selectively produce a spark in the combustion chamber, intake and exhaust valves, movably mounted in the head, which are arranged on both sides of an axial mid-plane of the cylinder and which selectively close off the combustion chamber, and an injection pump which selectively supplies the injector with a flow of pressurized gasoline.

Although this definition uses very concrete and precise terms, such as injector, spark plug, or spark, for the sake of clarity, it should be understood that these terms cover their technical equivalents, the words mentioned by way of example thus being respectively synonymous with injection means, ignition means, and ignition point.

The engines thus defined are well known to the expert in the field.

The engines with spark ignition and direct fuel injection offer the possibility of optimized functioning with so-called "weak" mixtures, that is to say carbureted mixtures containing a very great excess of air, relative to stoichiometric conditions, with respect to the quantity of fuel introduced into the cylinder.

These engines not only offer great potential in terms of reduction of fuel consumption, but also they participate in environmental protection inasmuch as the excess of air makes possible complete combustion of the fuel, and thus prevents release of unburned fractions in the exhaust gases.

The carbureted mixture which results from injection of fuel into the cylinder can be a homogeneous mixture or a stratified mixture in which the air/fuel ratio is not uniform in the whole cylinder, this latter case leading to localization near the ignition point of the carbureted mixture in a flammable air/fuel ratio.

Different solutions are known for producing a stratified mixture using direct fuel injection.

A first solution consists of producing wall effect stratification by directing the injection jet towards a wall, for example, in the direction of the upper surface of the piston, and then deflecting it towards the spark plug. This solution can have the disadvantage of leading to the formation on the walls of a film of liquid fuel which burns and produces soot. Furthermore, this solution does not make optimal stratification possible because the impact of the jet on the wall leads to excessive scattering.

A second solution consists of producing aerodynamic effect stratification by giving the air a well-defined movement so as to direct the fuel projected by the injector towards the spark plug. However, the localization of the fuel around the spark plug varies greatly from one cycle to another because of the random and turbulent nature of the air flow, which is detrimental to the stability of the engine and makes it difficult to regulate.

The third solution consists of positioning the injector and the spark plug in such a way that the fuel jet is projected by the injector directly towards the spark plug. This process is a priori very effective, but can be sensitive to the uncertainties affecting the positioning and to the characteristics of the fuel jet. Production of the stratified mixture results from injection of the fuel a short time before triggering of the combustion. Unlike in the preceding two solutions, the time available under these conditions for injection, atomization, vaporization of the gasoline, and preparation of the mixture before triggering combustion is very often insufficient. The liquid fuel, present during combustion and difficult to ignite, then causes fouling of the spark plug.

Another technique consists of assisting the fuel injection by means of an auxiliary injection of air. Although this process leads to relatively fine atomization of the fuel, it on the other hand requires the use of an additional system for the air compression.

Another known injection technique, described in the patent U.S. Pat. No. 5,992,353, consists of proceeding with injection of the fuel, in the vapor state mixed with superheated steam, at a pressure at least equal to 350 bar. This solution is in concrete terms inapplicable to automobiles, inasmuch as it requires on board an auxiliary water tank and a heat exchanger using the exhaust gases to vaporize the fuel and obtain the superheated vapor.

In this context, the present invention aims to offer an engine which, in spite of a relatively simple structure, operates with a very low production of soot, with a more rapid and reproducible combustion of fuel, and without fouling the injector holes.

For this purpose, the engine of the invention, which in other respects is in accordance with the generic definition given for it in the preamble above, is essentially characterized by the fact that the pressure of the flow of gasoline provided to the injector exceeds 300 bar, and is preferably at least equal to approximately 500 bar.

Thanks to this injection pressure, the duration of the injection of fuel into the combustion chamber can be reduced because of the increase of the static delivery. Moreover, the time thus gained can be used to advantage for the physical realization of atomization, evaporation and mixing of the fuel with the air.

The liquid fuel injected at this high pressure undergoes a primary atomization which breaks the jet into large drops, and then a secondary atomization which breaks these large drops into very fine drops. What is called the "break up" (that is to say fractionation) length, which characterizes the length of the jet necessary for realization of the primary atomization, is reduced by the increase of the speed of discharge of the fuel from the injector, which increases with the injection pressure.

It has appeared that for pressures greater than 300 bar, the fractionation length becomes negligible. The fuel then comes directly out of the injector in the state of a mist of droplets whose secondary atomization is finer. The jet is wider, which promotes mixing with the air contained in the combustion chamber and vaporization of the fuel. The finer atomization of the fuel makes faster vaporization possible and enables one to obtain an entirely evaporated and mixed air/fuel mixture at the time of combustion triggering. The mixture obtained is more homogeneous, burns faster, and produces less soot. The quantity of liquid fuel which reaches the spark plug is reduced, which reduces fouling of the spark plug. The increase of the speed of combustion allows triggering combustion closer to top dead center of the piston in the cylinder, and therefore an increase of efficiency of the cycle. The reduction of the pollutants and soot makes possible a considerable increase of the combustion efficiency.

Furthermore, the time gained in execution of each of the phases of injection, atomization, and vaporization makes it possible to inject later during the compression phase, and therefore under higher pressure conditions, which promotes reduction of penetration of the jet, and at a higher temperature, which promotes vaporization.

In an advantageous embodiment of the invention, a recess can be formed in the upper surface of the piston in order to ensure containment of the gasoline injected into the combustion chamber.

As for the lower surface of the head, it can be shaped like a roof and have a crest in the axial mid-plane of the cylinder.

Preferably, the injector is closer to the axis of the cylinder than is the spark plug, and for example, is arranged on the axis of the cylinder itself.

The injector and the spark plug are advantageously separated by a distance at least equal to 5 millimeters and at most equal to 30 millimeters.

The injector can inject the gasoline into the combustion chamber roughly in the shape of an injection cone with a cone angle at least equal to 40 degrees and at most equal to 100 degrees, with it being possible for this cone to be formed by a single jet, such as a hollow and continuous jet, or by several distinct jets, and for example, two to twelve jets.

The injector and the spark produced by the spark plug can be separated by a distance at least equal to 10 millimeters and at most equal to 30 millimeters, while the injection cone and the sparks of the spark plug are, for example, separated by a distance at least equal to 1 millimeter and at most equal to 10 millimeters.

The engine of the invention preferably has two intake valves on a first side of the axial mid-plane of the cylinder and two exhaust valves on a second side of the axial mid-plane of the cylinder, with it being possible for the spark plug to be arranged between the two intake valves, or between an intake valve and an exhaust valve.

Other characteristics and advantages of the invention will emerge clearly from the description given for it in the following, in an indicative and in no way limiting basis, with reference to the appended drawings, in which:

FIG. 1 is a partial schematic section of an engine according to the invention;

FIG. 2 is a view from below, on a reduced scale, of the lower surface of the head of the engine illustrated in FIG. 1; and FIG. 3 is a view similar to FIG. 2, illustrating an embodiment variant.

As stated in the preceding, the invention relates to an internal combustion engine with spark ignition and with direct fuel injection.

This engine, in a non-limiting manner and in a known manner (FIG. 1), has cylinder 1, head 2, piston 3, combustion chamber 4, fuel injector 5, spark plug 6, one or preferably two intake valves 71, one or preferably two exhaust valves 72, and injection pump 8.

Cylinder 1 is elongated along its longitudinal axis Z and is closed off at one of its ends by head 2 which is attached to cylinder 1.

Piston 3 is mounted so as to slide in a sealed manner in cylinder 1 along axis Z and closes off the other end of this cylinder.

Combustion chamber 4 is thus defined in cylinder 1 between lower surface 20 of head 2 and upper surface 30 of piston 3.

Fuel injector 5 is connected to head 2 and opens into combustion chamber 4.

Spark plug 6 is connected to head 2 and has electrodes 60 which produce a spark in combustion chamber 4 when piston 3 is in the vicinity of its top dead center.

Intake valves 71 and exhaust valves 72 are movably mounted in head 2 and are arranged on both sides of axial mid-plane P of cylinder 1 in such a way as to define an intake side and an exhaust side.

The two intake valves 71 are moved by a cam shaft, or controlled directly, in such a way as to place combustion chamber 4 in communication with intake manifold 710 at a chosen instant preceding compression.

In a similar manner, the two exhaust valves 72 are moved by a cam shaft, or controlled directly, in such a way as to place combustion chamber 4 in communication with exhaust manifold 720 at a chosen instant after combustion.

Finally, injection pump 8 provides injector 5 with a flow of pressurized gasoline at a chosen instant during compression.

According to an essential aspect of the invention, the pressure of the gasoline flow provided to injector 5 by pump 8 exceeds 300 bar and preferably reaches or exceeds 500 bar.

Other characteristics, although less important, can be provided in order to optimize the effects obtained by the high injection pressure prescribed by the invention, and are listed in the following.

First of all, concave recess 300 can be formed in upper surface 30 of piston 3 in order to ensure containment of the gasoline injected into combustion chamber 4.

Furthermore, lower surface 20 of head 2 can be shaped like a roof and have crest 21 in axial mid-plane P of cylinder 1.

As shown in FIGS. 2 and 3, crest 21 thus separates head 2 into a part dedicated to intake (on the right in the figures) and in which the two intake valves 71 are provided, and a part dedicated to exhaust (on the left in the figures) and in which the two exhaust valves 72 are provided.

Spark plug 6 can then be arranged between the two intake valves 71 (FIGS. 1 and 2) or between an intake valve 71 and an exhaust valve 72 (FIG. 3).

Injector 5 is arranged closer to axis Z of the cylinder than is spark plug 6, and preferably on axis Z itself.

Injector 5 and spark plug 6 are separated by a distance advantageously between 5 millimeters and 30 millimeters, the distance between injector 5 and the spark produced by spark plug 6 then typically being between 10 millimeters and 30 millimeters.

Injector 5 preferably injects gasoline into combustion chamber 4 in the form of a number of distinct jets, between two and twelve jets.

These jets form injection cone 9 (FIG. 1), which has a cone angle A, for example, between 40 degrees and 100 degrees.

Finally, injection cone 9 and the sparks formed by electrodes 60 of the spark plug are separated by a distance preferably between 1 millimeter and 10 millimeters.

What is claimed is:

1. An internal combustion engine, with spark ignition and with direct fuel injection, comprising at least one cylinder elongated along an axis (Z), a head which closes off the cylinder in a fixed manner, a piston mounted so as to slide in a sealed manner in the cylinder along the axis (Z) of the cylinder, a combustion chamber defined in the cylinder between a lower surface of the head and an upper surface of the piston, a fuel injector connected to the head and opening into the combustion chamber, a spark plug connected to the head and having electrodes which selectively produce a spark in the combustion chamber, intake and exhaust valves, movably mounted in the head, the valves being arranged on both sides of an axial mid-plane (P) of the cylinder, and which selectively close off the combustion chamber, and an injection pump which selectively supplies the injector with a flow of gasoline at a pressure exceeding 300 bar, wherein the injector injects the gasoline into the combustion chamber roughly in the shape of an injection cone with a cone angle (A) at least equal to 40 degrees and at most equal to 100 degrees.

2. An internal combustion engine according to claim 1, wherein the pressure of the flow of gasoline provided to the injector is at least equal to 500 bar.

3. An internal combustion engine according to claim 1, wherein a recess is formed in the upper surface of the piston in order to ensure containment of the gasoline injected into the combustion chamber.

4. An internal combustion engine according to claim 1, wherein the lower surface of the head is roof-shaped and has a crest in the axial mid-plane (P) of the cylinder.

5. An internal combustion engine according to claim 1, wherein the injector is closer to the axis (Z) of the cylinder than is the spark plug.

6. An internal combustion engine according to claim 1, wherein the injector is arranged on the axis (Z) of the cylinder.

7. An internal combustion engine according to claim 1, wherein the injector and the spark plug are separated by a distance at least equal to 5 millimeters and at most equal to 30 millimeters.

8. An internal combustion engine according to claim 1, wherein the injector injects the gasoline into the combustion chamber in the form of a plurality of distinct jets comprising between two and twelve jets.

9. An internal combustion engine according to claim 1, wherein the injector and the spark produced by the spark plug are separated by a distance at least equal to 10 millimeters and at most equal to 30 millimeters.

10. An internal combustion engine according to claim 1, wherein the injection cone and the spark produced by the spark plug are separated by a distance at least equal to 1 millimeter and at most equal to 10 millimeters.

11. An internal combustion engine according to claim 1, comprising two intake valves on a first side of the axial mid-plane (P) of the cylinder and two exhaust valves on a second side of the axial mid-plane (P) of the cylinder, wherein the spark plug is arranged between the two intake valves.

12. An internal combustion engine according to claim 1, comprising two intake valves on a first side of the axial mid-plane (P) of the cylinder and two exhaust valves on a second side of the axial mid-plane (P) of the cylinder, wherein the spark plug is arranged between an intake valve and an exhaust valve.

13. An internal combustion engine according to claim 3, wherein the recess is concave and has a substantially uniform depth.

* * * * *